United States Patent [19]

Bendler

[11] 4,444,010

[45] Apr. 24, 1984

[54] ROTARY POWER ELEMENT

[75] Inventor: Hellmut Bendler, Fürth-Dambach, Fed. Rep. of Germany

[73] Assignee: Dynamit Nobel Aktiengesellschaft, Troisdorf, Fed. Rep. of Germany

[21] Appl. No.: 173,841

[22] Filed: Jul. 30, 1980

[30] Foreign Application Priority Data

Aug. 1, 1979 [DE] Fed. Rep. of Germany ....... 2931164

[51] Int. Cl.³ .............................................. A62B 35/02
[52] U.S. Cl. ........................................ 60/407; 60/632; 92/245; 242/107; 280/806; 297/480
[58] Field of Search ........................ 242/107; 280/806; 297/480; 60/407, 632, 636, 370; 92/129, 245, 120, 248, 249, 138, 137

[56] References Cited

U.S. PATENT DOCUMENTS

| | | | |
|---|---|---|---|
| 3,381,863 | 5/1968 | Towns | 92/245 X |
| 3,487,897 | 1/1970 | Hahm et al. | 92/248 |
| 3,522,918 | 8/1970 | Wrighton | 280/806 X |
| 3,731,597 | 5/1973 | Payne | 92/129 X |
| 3,779,672 | 12/1973 | Schroeder | 92/248 X |
| 3,859,789 | 1/1975 | Fawcett et al. | 60/370 X |
| 3,927,329 | 12/1975 | Fawcett et al. | 60/370 X |
| 3,965,802 | 6/1976 | Jacobs | 92/140 X |
| 3,976,257 | 8/1976 | Fohl | 242/107 X |
| 4,006,644 | 2/1977 | Beier | 280/806 X |
| 4,155,224 | 5/1979 | Hopping | 60/370 X |
| 4,179,885 | 12/1979 | Hopping | 60/370 |

FOREIGN PATENT DOCUMENTS

| | | | |
|---|---|---|---|
| 3355 | 8/1979 | European Pat. Off. | |
| 352925 | 7/1931 | United Kingdom. | |
| 1309846 | 3/1973 | United Kingdom | 60/632 |
| 1408236 | 10/1975 | United Kingdom. | |

*Primary Examiner*—Gerald A. Michalsky
*Attorney, Agent, or Firm*—Antonelli, Terry & Wands

[57] ABSTRACT

A rotary power element for tensioning devices of safety mechanisms for protecting the occupants of vehicles by the use of safety belts has a rotatable drive mechanism, a compress-gas generator, and a tubular element between the drive mechanism and the compressed-gas generator. Also, the element includes at least one preformed acceleration member arranged in the tubular element. This member is capable of being driven forward against the drive mechanism under the action of compressed gas produced by said compressed-gas generator to accelerate the drive mechanism.

22 Claims, 6 Drawing Figures

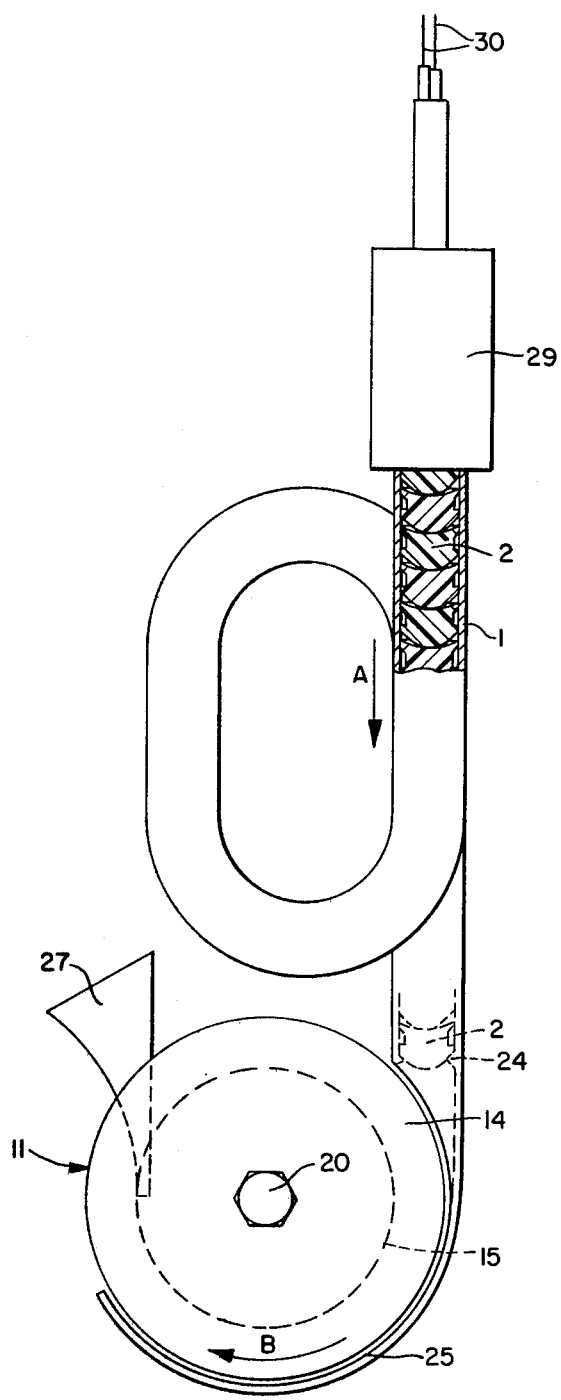
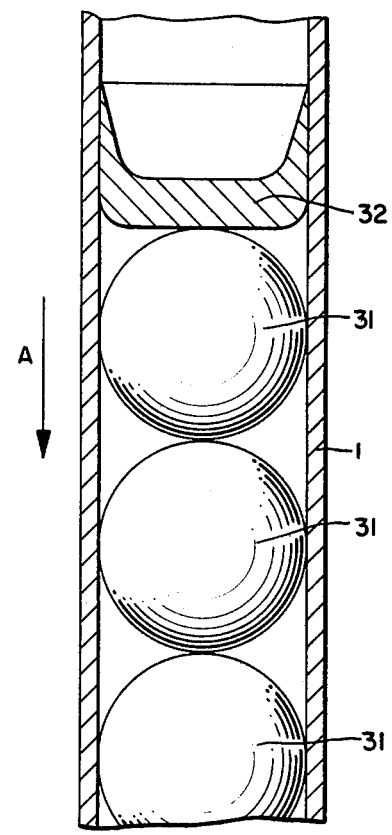
FIG. 5.
FIG. 6.

ROTARY POWER ELEMENT

The invention relates to a rotary power element or unit that is especially useful for controlling the operation of a seat belt in an automotive vehicle.

A rotary power element, especially for safety belts, is known from DOS [German Unexamined Laid-Open Application] No. 2,644,315. This element serves as a tightening device or retractor in order to roll up a slack safety belt in a collision situation and thus to tighten the belt until the belt contacts the body of the person to be protected in a sufficiently taut manner. The rotary power element is triggered by means of a sensor responding, for example, when a predetermined deceleration value has been exceeded. Such a sensor is described, for example, in DOS No. 2,207,831. The rotary power element has compressed-gas generator and a shaft which can be connected, for example, with an automatic belt roll-up mechanism. A turbine wheel operated by compressed gas preferably serves as a rotational drive mechanism or means for rotating the shaft.

The compressed-gas generator activating the rotatable drive means can be, for example, a compressed-air cylinder under a correspondingly high internal pressure. With a view toward maximum space utilization, however, a propellant charge, a pyrotechnical charge, or the like is preferably provided for the compressed-gas generator, ignitable electrically or mechanically by percussion and generating the compressed gases only during the reaction of such charges. The propellant charge can be compressed, for example, in correspondence with the mixtures set forth in German Pat. No. 1,646,313.

The compressed gases can be directly effective on the rotatable drive mechanism. However, in view of attaining a maximally high torque, it is advantageous to provide an indirect action, by arranging between the compressed-gas generator and the drive mechanism a liquid, suspension, or the like in an appropriate container, cylinder, or the like, which is accelerated by the compressed gases and impinges as a fluid mess stream of high kinetic energy on the drive mechanism. It proved to be especially advantageous, in this connection, to accommodate the fluid medium in a pipe disposed between the compressed-gas generator and the drive mechanism, which pipe, due to the generally restricted space conditions, is normally curved, for example in the form of a pipe coil, but which can also be more or less straight.

In this context, it has been found unsatisfactory that the liquid, suspension, or the like must be enclosed in the pipe even over very long periods of time, such as 10 years and more, in a completely sealed fashion, and an undesirably large compensating space is required, for example, to take into account the varying expansion characteristics of pipe and liquid, suspension, or the like, within the given temperature range. This compensating space can be designed as a correspondingly long, additional pipe section which, at the minimum temperature, is devoid of the liquid, suspension, or the like, whereas it is substantially filled up by the fluid at the maximum temperature: however, in this connection, considering the thus-produced compression of the gas—normally air—enclosed in the pipe, the tight seal of the pipe must not be damaged. Furthermore, during the deployment of these rotary power elements, the surroundings may be contaminated, for example, if water was added antifreeze agent, anticorrosion agent, or the like is utilized as the fluid.

The invention is based on the object of the avoiding, in a rotary power element of the type useful for operating a safety belt, which includes a rotatable drive means, a compressed-gas generator and a tubular element leading from the generator to the drive mechanism, especially the above-described disadvantages and of constructing this rotary power element in such a way that, with a minimum of manufacturing expense, a high functional reliability, even over relatively long periods of time, and under very contrasting conditions, as well as without deleterious side effects on the surroundings, a high torque can be generated.

This object has been attained according to the invention by providing an element that has at least one performed acceleration member arranged in the tubular element, the member being driven against the drive mechanism to accelerate the rotation of this mechanism. The separate acceleration members of a predetermined configuration associated with the drive mechanism are made of a solid material which, at the loads occurring in this case, are at least substantially dimensionally stable. They can be made, for example, of a metal, such as lead, aluminum, or the like, and can have a disk-shaped, plug-like, cylindrical, or like configuration. These acceleration members can be produced in simple way, for example by a noncutting shaping step, and can be reliably arranged within the tubular element and the tubular element need no longer be tightly sealed with respect to the outside, but rather need only be constructed so that the acceleration members cannot drop or slide unintentionally out of the tubular element or become disengaged therefrom in some other way. The number of acceleration members arranged in series in the tubular element depends on the conditions of an individual case, i.e. on the size of the torque to be produced, the required rotational movement of the drive mechanism, the permissible structural size of the rotational power element, and so forth. Thus, there can be instances where a single performed acceleration member or also two such acceleration members may suffice for the required function of the rotational power element. However, preferably several, especially a relatively large number of separate acceleration members are provided.

The tubular element is preferably a pipe, for instance a commercial pressure pipe of steel or the like. Preferably the inside cross section of this pipe is small in relation to its length. Furthermore, the inside cross section is preferably circular, but it can also be, for example, oval, square, or rectangular, optionally with rounded narrow sides, in case of acceleration members which are correspondingly adapted in cross section. The pipe can be straight, but in view of the general necessity for compactness, the pipe is designed to be preferably more or less curved, for example coiled in a spiral shape, like a truncated cone, like a helix, or the like. To exclude an undesired change in the configuration of the curved pipe zones when the drive mechanism is triggered, due to the dynamic shock stress exerted by the acceleration members, which are greatly accelerated under the compressed-gas effect, these pipe zones are suitably additionally fixed with respect to one another or with respect to neighboring components, for example by being cemented, soldered, welded together in spots, by being surrounded with an external protective sleeve, or by being threadedly connected or the like to other parts.

However, it is also possible to use as the tubular element, for example, cylinders, sleeves, or other types of housings which have like, or at least quasi behavior as a pipe in their function with respect to the accommodation, guidance, etc., of the preformed acceleration members.

The solid acceleration members of a predetermined configuration according to the invention, in addition to being readily accommodated and mounted in the tubular element, which element needs no longer be sealed tightly with respect to the outside, exhibit the further advantage that a possibly varying thermal expansion of acceleration members and tubular element is of a substantially lesser, in practice negligible, influence than in case of a liquid, suspension, or the like to be accelerated. This is so, because in the preformed acceleration members the expansion is effective in all three dimensions, whereas in case of a fluid mass such expansion is, in effect, totaled into a practically linear, and correspondingly greater, expansion in the longitudinal direction of the tubular element. It is furthermore advantageous that due to the acceleration members of this invention there is no deleterious contamination or the like, which cannot be removed, or can be eliminated only with difficulties, in the surroundings of the rotary power element when its function is triggered.

The size of the torque producible with the rotary power element depends, inter alia, on the mass and velocity of the acceleration members of this invention, with which these members enter the rotatable drive mechanism and/or impinge on this drive mechanism. A rotary piston can be provided as the drive mechanism for example, which is arranged in a housing. The shaft of this rotary piston, which shaft is to be rotated and is connected, for example, to the belt reel of a safety belt, is equipped with a single radial lug, vane, or the like, to which the separate acceleration members, introduced in succession into the housing of the drive mechanism, transfer their kinetic energy. This rotary piston, though, executes less than one revolution, whereby the retraction path of the safety belt is correspondingly restricted.

Insofar as longer retraction distances should be required, such distances can be provided by means of the preformed acceleration members in a very simple way, for example by operatively associating a rail-type, strip-like, or other guiding means with a wheel, a rotatable disk, or the like having a circular-cylindrical working surface. In this arrangement, an interspace is formed between the working surface and the guide means so that the acceleration members exiting under the effect of the compressed-gas from the tubular element and being driven through the interspace are pressed against the working surface of the wheel, the disk, or the like in such a way that the members set the wheel, the disk, or the like into rotation due to the thus-produced friction forces and make the desired retraction movement possible. Insofar as a second corresponding wheel, disk, or the like is provided instead of the stationary contact means, the working surface of which then acts simultaneously along the lines of a contact surface, both wheels, disks, or the like are set into rotation by the acceleration members urged through between their opposed working surfaces, so that one has quasi two coupled rotational power elements which, for example, make it possible to tension two safety belts. To improve the force transfer from the acceleration members to the rotatable drive mechanism, the mechanism can be roughened on its working surface, or can be provided on its working surface with teeth, grooving, or the like, so that—presupposing an appropriate deformability of the material of the acceleration members—there is at least also a certain shape-mating contact while the acceleration members are urged through the interspace, in addition to the presence of a frictional contact, which increases the transfer of the kinetic energy to the drive mechanism.

As indicated above, the tubular element is preferably shaped to be more or less curved for optimum adaptation to the respective spatial conditions under which the rotary power element is to be used. In a suitable embodiment of the invention, it is suggested especially for these cases to fashion the acceleration members, which are laterally in contact with the inside wall of the tubular element so that the acceleration members arranged in series within the tubular element are in mutual contact on an area smaller than the cross-sectional area of each. This has the advantageous result that the displacement or pivotal motions between the series-disposed and mutually contacting acceleration members, occurring during the longitudinal travel of the acceleration members through these curved zones of the tubular element, are less strongly impeded whereby, in total, the longitudinal motion of the acceleration members in the tubular element, desired under the effect of the compressed gas, is promoted. For this purpose, it is possible, for example, to fashion the acceleration member which is, respectively, located in front—as seen in the travel direction—with a rearward planar end face and the acceleration member contacting the former member from the rear with a forward, truncated-cone-shaped end face, wherein the contact area between both members is determined by the free planar topside surface of the truncated cone; this surface area constitutes only a fraction, determined in accordance with each particular case, of the cross-sectional area of the tubular element. The contact area which thus only constitutes a part of the end face is arranged preferably centrally—based on the end face of the acceleration members—to attain a maximally uniform force load.

The forces occurring during the relative motion between two mutually contacting acceleration members can be still further reduced by an arrangement wherein at least one of the contacting areas is of a convex shape. For example, the previously described, planar top surface of the truncated cone can be replaced by an arcuate surface, or the acceleration members are initially shaped as spherical, ellipsoidal, or like articles. A further improvement in the displaceability between the acceleration members and the forces occurring between them can be attained wherein one member has a convex contacting area and the associated other member has a concave contacting area of lesser curvature. In this arrangement the acceleration member with the convex contact surface or area can then roll along in the concave contact surface of the other member. With these minor rolling motions, the actual, more or less point-like contact between the two members is less greatly shifted from the center of the acceleration members toward the side than in case of a rolling movement of a convex surface on a plane, i.e. the eccentricity of the force effect is advantageously reduced. An especially advantageous embodiment of this type is achieved wherein by the at least substantially convex surface at the front end of the acceleration member, there is attained, for example, not only an even smoother or lower-friction motion process in the tubular element, but also the entrance of the acceleration members into the drive mechanism and/or into a gap provided between the drive mechanism and a guide means is facilitated.

A further provision can be made, to reduce friction in the tubular element, especially in the curved zones thereof, by fashioning the acceleration members to reduce their contact area on the inner wall of the tubular element. In this connection, an arrangement has proven to be especially advantageous, according to which two narrow, annular guide elements, contacting the inner wall of the tubular element, provide not only a reduction in friction, but at the same time also an advantageous guidance of the acceleration members in the tubular element. Also, the rearward guide element can simultaneously be fashioned as a more or less resilient sealing lip, the contact of which with the inner wall of the tubular element can be even more enhanced under the action of the compressed gas. If several such acceleration members are disposed in series, no complete sealing action with regard to the compressed gas is required in case of the individual member, since they act in total in the manner of a labyrinth seal and thus, in spite of gas leakage along the individual member, the necessary gastightness is furnished after all.

The acceleration members are preferably made of a synthetic resin, especially by a noncutting shaping step. It is possible to use thermosetting plastics as well as, for example, rubber-elastic synthetic resins of a sufficient hardness; however, preferred are thermoplastic synthetic resins especially polycarbonate, polyethylene, or polyamide.

It has been pointed out that it is possible to use as the rotatable drive mechanism to be activated by the preformed acceleration members, for example, a wheel having a circular-cylindrical working surface and a contacting guide means associated therewith. However, the drive mechanism is preferably constructed as a wheel having a continuous profiled groove along its circumferential surface. The inside cross section of the profiled groove is adapted to the cross-sectional shape of the acceleration member so that a maximally large contact area results between the two components, this area being smaller as compared with the cross section of the acceleration members to such an extent that the acceleration members, driven into the profiled groove under the effect of the compressed gas, are frictionally connected with the wheel in the intended fashion. A special contact means is unnecessary in this embodiment. The end of the tubular element on the exit side is arranged proximate to the profiled groove and aligned with respect to the groove preferably in such a way that the acceleration members are driven at least approximately tangentially to the bottom of the profiled groove into the groove under the effect of the compressed gas, thus setting the wheel into rotation. For an additional increase in power transmission to the wheel, the surface of the profiled groove can also in this case again be provided, in its contact zone with the acceleration members, with a roughened face, fluting, serrations, or the like. In this way, there results at least a certain additional shape-mating connection between the wheel and the acceleration members. The wheel is preferably constructed as a disk-shaped wheel, but it could also be fashioned, for example, as a spoked wheel.

This rotatable drive mechanism is of an advantageously extremely simple structure as compared to the fluid-operated turbine wheel described, for example, in DOS No. 2,644,315, it can be manufactured with very low production costs, and yet effects an especially favorable power transmission and torque generation.

If the rotatable drive mechanism is utilized, for example, to tension safety belts, a limitation of the torque transmitted from the drive mechanism to the shaft of the tensioning means is advantageous to avoid injuries to the persons to be protected on account of the tightening action. In this connection it is known to arrange a safety (slipping) clutch between the drive mechanism and the shaft. According to one aspect of this invention, the provision is made instead to fashion the profiled groove of the drive wheel proper quasi as a safety clutch, by making the sidewalls of this groove resilient, for example elastically spreadable, under the force effect of the acceleration members, once the tensioning force and thus the produced torque have reached the predetermined magnitude. Thus the rotatable drive mechanism can be advantageously joined rigidly to the shaft of a tensioning means or the like to be driven, without the transmission of improperly high torques to the shaft.

One embodiment of this construction which is especially simple and reliable from a manufacturing viewpoint is a wheel having two circular halves. The wheel is constructed to be divided perpendicularly to its axis in one plane, namely independently of the fact whether it is fashioned as a spoked wheel, a disk wheel, or the like. In case of the disk wheel, which is preferably employed, the two halves are constructed as disks, of which, for example, one disk is arranged to be displaceable with a defined friction seat on the shaft fixedly joined to the other disk. In the initial condition, both disks are in mutual contact and the profiled groove extending in the peripheral direction is formed between them. When the predetermined torque has been reached, the two disks, while overcoming the constantly effective friction forces, are axially urged apart to a minor extent, and the profiled groove is correspondingly expanded. However, the provision of a spring means acting in the axial direction instead of the friction-seat mounting has proven to be especially advantageous. This spring means urges the half of the wheel displaceable on the shaft against the other half with a preferably adjustable spring force. The spring means can be constructed as a helical spring, a cup spring, or the like.

In order to prevent the acceleration members, which are driven in succession into the profiled groove under the compressed gas action, from a perhaps too early departure from the profiled groove, this departure being further promoted by the centrifugal forces occurring during revolution of the wheel, this invention provides a cover which is stationary with respect to the wheel and covers the profiled groove at least along part of its axial width and along a more or less large portion of its circumference. Consequently, the acceleration members are maintained in their frictional and/or shape-mating connection with the wheel. To reduce friction between the acceleration members and the cover, the cover can be equipped, for example, with a very smooth surface or with a friction-reducing coating, for instance a coating comprised of polytetrafluoroethylene.

Insofar as the wheel is to execute more than one revolution, and the acceleration members have not voluntarily left the profiled groove before reaching, during the revolving motion, the end of the tubular element on the exit side, the provision is made to arrange a deflector—also called baffle—stationary with respect to the wheel, the acceleration members running against the part of the deflector extending into the profiled groove and thereby being deflected out of the profiled groove, so that additional acceleration members can then be driven into the profiled groove which now is empty again.

Depending on the utilization and accommodation of the rotary power element of this invention, it can be advantageous to collect the acceleration members, after these members have completed their function, i.e. after acceleration of the drive mechanism, in a collecting device, such as a container, a bag, or the like. However, such a collecting device can also be constituted, for example, by cavities in structural parts of automotive vehicles, airplanes, or the like.

The rotary power element of this invention is utilized, in particular, in conjunction with automatic or also rigid safety belts in vehicles, airplanes, or the like; however, it can also be applied in case of safety nets or similar safety devices in conveyances which are to be activated in an accident situation. In this connection, the rotatable drive mechanism can also effect the simultaneous deployment of several safety devices, for example by arranging on both sides of the drive mechanism respectively one belt roll-up means and connecting the mechanism therewith. Moreover, it is basically also possible to utilize the element in all those cases wherein kinematic processes during which a rotational movement occurs are to be executed in response to a signal. This can be, for example, the coiling of ropes, the tensioning of coil springs, the starting procedure of reciprocating engines, or also translatory motion processes initiated by way of a rotational movement with the interposition of a rack or the like.

Embodiments of the invention are shown schematically in the drawings and will be explained in greater detail below with reference thereto, identical reference numerals being used for the same parts in the various figures. In the drawings:

FIG. 5 is an elevated view partly in section of a rotary power element of this invention; and FIG. 6 shows another embodiment of the tubular element illustrated in FIG. 1.

Figure 1:
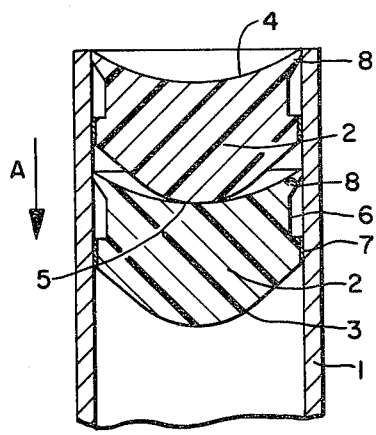
FIG. 1 shows a fragmentary view of a straight tubular element.
Figure 2:
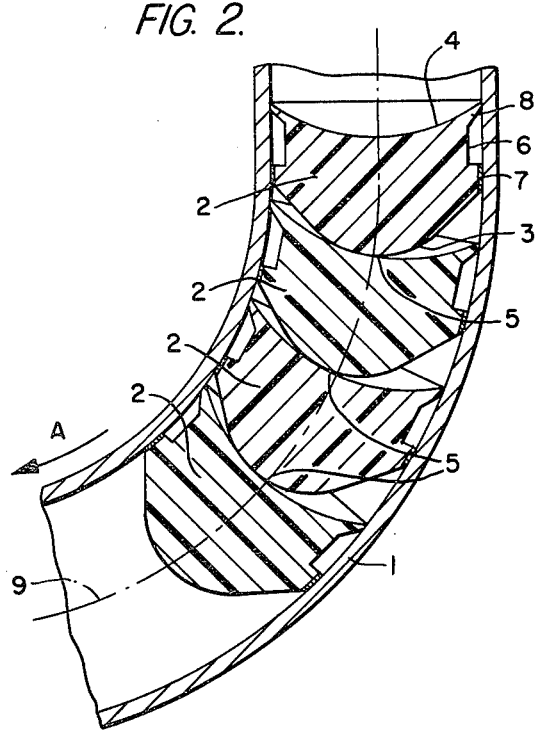
FIG. 2 shows a fragmentary view of a curved tubular element.

The tubular element 1, shown in FIGS. 1 and 2 on an enlarged scale and in a sectional view, is fashioned as a pipe having a circular cross section wherein the separate acceleration members 2 made of a thermoplastic synthetic resin with a given form are inserted in mutual contact therein. The ejection or motion direction of the acceleration members 2 in the pipe 1 is indicated by the arrow A. The acceleration members 2 exhibit at their front ends the convex surface 3 and at their rear ends the concave surface 4, the curvature of the surface 4 being lesser than that of surface 3. The central contact area 5 of the acceleration members 2 with respect to one another is smaller than the inside pipe cross section. On their peripheral surfaces, the acceleration members 2 exhibit the continuous recess 6 limited toward the front by the guide strip 7 and toward the rear by the lip 8 serving as the guiding and sealing element. The strip 7 and the lip 8 are in contact with the pipe wall on the inside and effect at least a certain gastightness and retention within the pipe 1.

As can be seen from FIG. 2, the acceleration members 2 are also held in a defined fashion in curved pipe zones and/or move therethrough in an orderly manner, wherein the contact surface 5 is laterally displaced by an only minor extent with respect to the center, depicted by the pipe axis 9.

Figure 3:
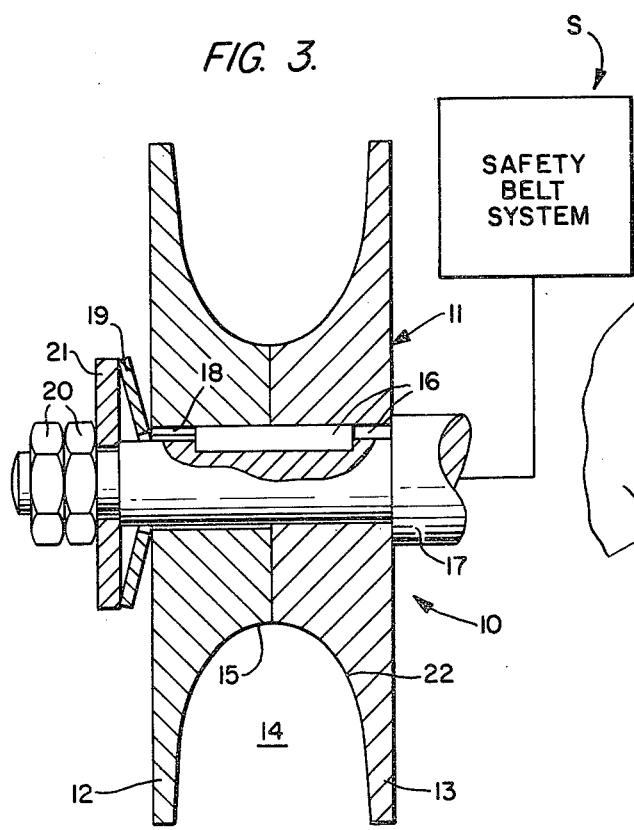
FIG. 3 shows a drive mechanism.

The rotatable drive mechanism 10 shown in FIG. 3 on an enlarged scale and in cross section is fashioned as a wheel 11 composed of the two disk-shaped halves 12 and 13, between which the peripherally extending profiled groove 14 is formed with a cross section which continuously narrows toward the bottom 15; the acceleration members 2 can be injected into this groove with a friction fit and optionally an additional shape-mating contact under the effect of the compressed gas. The two disks 12 and 13 are connected via the tongue-and-groove joint 16 to the shaft 17 of the drive mechanism 10 for rotation therewith; this shaft is, in turn, fixedly connectible, for example, to the belt reel of a vehicle safety belt system generally designated by the reference character 5. The "outer" disk 12 is mounted to be displaceable with a small radial play 18 on the shaft 17, and is urged with a definite spring force against the other disk 13 via the biased cup spring 19 and the pressure plate 21 held by means of the screw connection 20. The groove 14 of the disk wheel 11 can optionally be roughened on its surface 22, for example.

Figure 4:
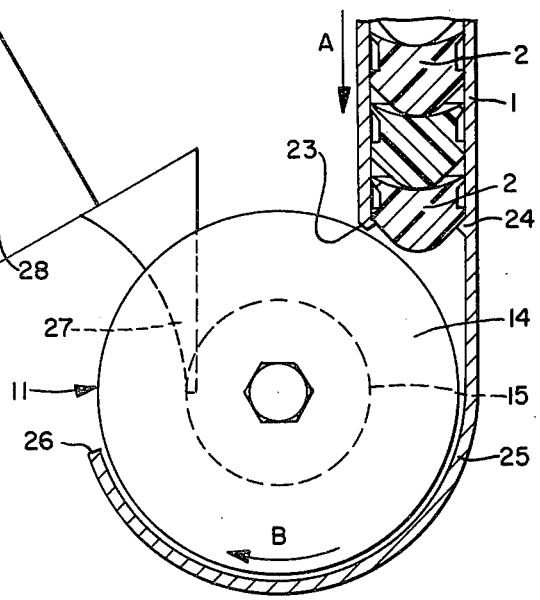
FIG. 4 shows a drive mechanism in an elevational view with associated tubular element.

In FIG. 4, the disk wheel 11 is shown in a side view, and the pipe 1 with acceleration members 2, associated with the wheel, is shown in a sectional view. At the exit end 23 of the pipe 1, the inwardly projecting mounting 24 for the acceleration members 2 is provided to secure the members until the function is triggered, for example against vibration or shock stresses in the conveyance.

The mounting 24 can be, for example, several holding lugs distributed around the pipe circumference, or also an annular holding collar. A tight sealing of the pipe 1 is unnecessary. The mounting 24 is pressed aside when the function is triggered by the acceleration members moving in the direction of arrow A so that the acceleration members are injected into the groove tangentially to the base 15 of the groove, indicated in dashed lines. To prevent a premature exiting of the acceleration members 2 from the groove 14 during operation of this device and rotation of the disk wheel 11 according to arrow B, this groove is provided along part of its periphery with the cover 25, here formed integrally with the pipe 1. The deflecting means 27, shown as a wedge-shaped baffle, is arranged at a predetermined distance from the end 26 of the cover, this deflecting means urging the acceleration members 2 from the groove 14 and guiding them into the collecting or catching device 28, shown only partially in a fragmentary view.

FIG. 5 shows a practically complete rotary power element with a pipe 1 bent into a loop shape and with acceleration members 2 arranged therein in mutual contact and having a predetermined configuration, with a disk wheel 11, a cover 25, and baffle 27. At the "inlet-side" end of the pipe 1, the pipe is connected, for example, by a threaded connection with the compressed-gas generator 29 shown in elevational view, this generator being preferably a propellant charge cartridge arranged in a cartridge chamber and adapted to be triggered via the two electrical ignition lines 30. When using this rotary power element as a tensioning means for respectively one safety belt, pipes having a free inside diameter of between about 8 and 20 mm with a length of about 200–400 mm and with a corresponding "column" of a plurality of acceleration members proved to be advantageous. The wall thickness of these pipes, manufactured from steel as customarily used for pressure pipes, was between about 0.5 and 2 mm.

Finally, FIG. 6 shows on an enlarged scale a fragmentary view of a pipe 1 wherein the acceleration members are constructed as balls 31 of preferably hard synthetic resin. In this case, it is advantageous to arrange a piston 32 of preferably a synthetic resin on the side facing the compressed-gas generator, not shown. It is furthermore suitable to fashion the piston 32 in a dish shape to attain a satisfactory seal and utilization of the compressed gases. To avoid movements of the balls 31, for example, due to jarring during transportation, these balls are, in turn, retained with an appropriate displaceable or deformable holding means at the exit-side end of the pipe 1.

What is claimed is:

1. A rotary power element for actuating tensioning devices which comprises a rotatable drive mechanism, a compressed-gas generator means, a tubular element between the drive mechanism and the compressed-gas generator means, and a plurality of preformed acceleration members arranged in mutual contact with each other in said tubular element, said compressed-gas generator means including a propellant charge means for simultaneously driving said acceleration members in mutual contact forward through and out of said tubular element against the drive mechanism under the action of compressed gas to rotate and to accelerate the drive mechanism.

2. A rotary power element according to claim 1, wherein said acceleration members are in mutual contact on an area smaller than the cross-sectional area of said acceleration members.

3. A rotary power element according to claim 2, wherein at least one of the mutually contacting surface areas of two acceleration members is of a convex shape.

4. A rotary power element according to claim 3, wherein the contact surface area contacting the convex surface contact area of one acceleration member and provided by the other acceleration member is fashioned as a concave surface of a lesser curvature.

5. A rotary power element according to claim 4, wherein the acceleration members, positioned in the tubular element in the advancing direction, have an at least substantially convex front face and an at least substantially concave rear face.

6. A rotary power element according to one of claims 1-5, wherein each acceleration member is made of one of a cylindrical, disc-shaped, and plug-like configuration and is provided on its peripheral surface with at least one recess extending in the peripheral direction.

7. A rotary power element according to claim 6, wherein the acceleration members have annular guide elements in the zone of the forward and rearward ends of its peripheral surface.

8. A rotary power element according to claim 7, wherein the rearward guide element is simultaneously fashioned as a sealing lip contacting the wall of the tubular element.

9. A rotary power element according to claim 8, wherein each acceleration member is made of a synthetic resin.

10. A rotary power element according to claim 1, wherein the propellant charge means is arranged in a cartridge chamber and is adapted to be triggered via electrical ignition means.

11. A rotary power element according to claim 1, wherein said rotatable drive mechanism includes a wheel defining a continuous profiled groove along a circumferential surface and said acceleration members are driven into said rotatable drive mechanism and engage the profiled groove.

12. A rotary power element according to claim 1, wherein means are provided for enabling a connection of the rotatable drive mechanism to a safety belt system of a vehicle.

13. A rotary power element for actuating tensioning devices which comprises a rotatable drive mechanism, a compressed-gas generator means, a tubular element between the drive mechanism and the compressed gas generator means, and a plurality of preformed acceleration members arranged in the tubular element, said compressed-gas generator means including a propellant charge means for simultaneously driving said preformed acceleration members forward through and out of said tubular element against the drive mechanism under the action of compressed gas to rotate and to accelerate the drive mechanism; said acceleration members being made of a synthetic resin and having annular guide elements at the forward and rearward ends of a peripheral surface thereof, with the rearward guide element providing a sealing lip contacting the wall of the tubular element and the rotatable drive mechanism comprising a wheel with a continuous profiled groove along its circumferential surface that is associated with the acceleration members to be accelerated, the shapes and dimensions of the profiled groove and of the acceleration members, respectively, conforming to each other whereby the acceleration members are driven into the profiled groove under the effect of the compressed gas to produce rotation and accleration of the wheel.

14. A rotary power element according to claim 13 wherein the profiled groove has means to expand its cross section against a continuously effective force.

15. A rotary power element according to claim 14, wherein the wheel has two circular halves placed against each other, between which the profiled groove is formed and which can be axially urged apart against a continuously effective force of a spring.

16. A rotary power element according to claim 13, wherein a cover is associated with the wheel, this cover partially extending over the profiled groove of this wheel.

17. A rotary power element according to claim 16, wherein the wheel is associated with a deflecting means extending into the profiled groove for guiding the at least one acceleration member out of this groove.

18. A rotary power element according to claim 17, characterized in that the drive mechanism is associated with a collecting means for receiving the plurality of acceleration members after the plurality of members have carried out the function of effecting rotation of said rotatable drive mechanism.

19. A rotary power element according to claim 17, wherein said deflecting means includes a wedge-shaped baffle member extending into the profiled groove and arranged at a predetermined distance from said cover for urging and guiding the acceleration members from the groove.

20. A rotary power element for actuating a tensioning device which comprises a rotatable drive mechanism, a compressed-gas generator means, a tubular element between the drive mechanism and the compressed-gas generator means, and a plurality of preformed acceleration members arranged in the tubular element; said rotatable drive mechanism including a wheel defining a continuous profiled groove along a circumferential surface; said compressed-gas generator means includes a propellant charge means for simultaneously driving said acceleration members in mutual contact forward through and out of said tubular member into said drive mechanism under the action of compressed gas to engage the profiled groove defined by said wheel to cause rotation and acceleration of the drive mechanism.

21. A rotary power element according to claim 20, wherein each acceleration member has an annular guide element providing a sealing lip contacting the wall of the tubular element.

22. A rotary power element according to claim 21, wherein each acceleration member is made of a synthetic resin.

* * * * *